United States Patent [19]

Smith

[11] 4,335,526
[45] Jun. 22, 1982

[54] VEHICLE DRYING MACHINE AND METHOD

[76] Inventor: Judson L. Smith, 5432 Lighthouse La., Tempe, Ariz. 85283

[21] Appl. No.: 171,337

[22] Filed: Jul. 23, 1980

Related U.S. Application Data

[63] Continuation of Ser. No. 932,273, Aug. 9, 1978, abandoned.

[51] Int. Cl.³ ............................................. F26B 15/10
[52] U.S. Cl. ................................... 34/229; 34/243 C; 239/587
[58] Field of Search ............. 15/DIG. 2; 34/222, 229, 34/243 C, 33; 98/40 A, 40 H; 222/3; 239/587, 589, 601

[56] References Cited

U.S. PATENT DOCUMENTS

| | | | |
|---|---|---|---|
| 1,698,822 | 1/1929 | Paxton | 239/587 X |
| 2,271,327 | 1/1942 | Chirgwin | 239/589 X |
| 2,758,392 | 8/1956 | Vani et al. | 34/229 |
| 2,776,168 | 1/1957 | Schweda | 239/587 |
| 3,742,615 | 7/1973 | Capra | 34/229 |
| 3,808,703 | 5/1974 | Kamiya | 34/243 C X |

FOREIGN PATENT DOCUMENTS

| | | | |
|---|---|---|---|
| 72618 | 1/1944 | Czechoslovakia | 239/587 |
| 1480133 | 5/1969 | Fed. Rep. of Germany | 34/243 C |
| 1480458 | 8/1969 | Fed. Rep. of Germany | 34/243 C |
| 2441573 | 11/1976 | Fed. Rep. of Germany | 98/40 H |
| 802448 | 10/1958 | United Kingdom | 239/587 |
| 905819 | 9/1962 | United Kingdom | 34/229 |

*Primary Examiner*—Albert J. Makay
*Assistant Examiner*—Harold Joyce
*Attorney, Agent, or Firm*—Woodard, Weikart, Emhardt & Naughton

[57] ABSTRACT

A set of round nozzles, all supplied from a plenum with air under comparatively high pressure and low volume is employed for drying the sides and top of a motor vehicle during its departure from washing apparatus. The nozzles are employed at an angle, and are oscillated for thorough coverage although with a concentrated blast of air from each nozzle. Preferably the nozzles are slender cone shaped to provide holding power of the air blast to remain concentrated at high velocity at a significant distance away from the nozzle outlet, for effectiveness on outer surfaces of not only standard sized cars, but also surfaces of smaller cars which, because of smaller car size, may be farther away from one or more such nozzles.

4 Claims, 10 Drawing Figures

VEHICLE DRYING MACHINE AND METHOD

This is a continuation of application Ser. No. 932,273, filed Aug. 9, 1978, now abandoned.

BACKGROUND OF THE INVENTION

1. Field of the Invention

This invention relates generally to motor vehicle washing apparatus, and more particularly to means and a method for removing water from the exterior surfaces during exit from the washing apparatus.

2. Description of the Prior Art

Many prior art patents are known for drying vehicles during departure from washing apparatus. The usual procedure has been to provide large blowers having substantial air volume capabilities and power requirements to discharge air from generally upstanding slots against the vehicle surfaces in a direction toward the rear of the vehicle, as it is moving forward away from the washing apparatus. One or several of such slot arrangements may be employed for each of the sides and top of the vehicle. An example is U.S. Pat. No. 3,570,042 issued Mar. 16, 1971 to Solomon.

The increased emphasis on energy conservation, as well as the natural interest in economical operation, has led to efforts to reduce the power requirements for dryers. The result has been reduction in pressure, with resultant reduction in air discharge velocities, while attempting to maintain large volumes of air for drying the vehicle. Further efforts to obtain satisfactory drying with such low air velocities have resulted in various means and methods for placing the discharge nozzles immediately adjacent the surfaces to be dried. These have included various combinations of rollers, wands, flexible or movable ducts, and the like. A 1963 patent showing some such concepts which are now in vogue is Hurst U.S. Pat. No. 3,085,351 issued Apr. 16, 1963.

There has remained a need for an effective dryer of comparatively simple construction, low cost, and low power requirements. The present invention is directed to meet that need.

BRIEF SUMMARY OF THE INVENTION

Described briefly, according to a typical embodiment of the present invention, a round nozzle is used to discharge air against the exterior surface of the vehicle. Air is supplied to the nozzle at comparatively high pressure and discharged at high velocity and in a compact pattern to blast the water off the vehicle. Coverage is obtained by oscillating such nozzles or by strategically locating them, or by a combination of these methods. The vehicle is moved relative to the nozzles as it leaves the washing apparatus and is thereby dried before exit from the wash establishment. Movement of a nozzle array, while the vehicle is stationary, could also be used.

DETAILED DESCRIPTION

Figure 1:
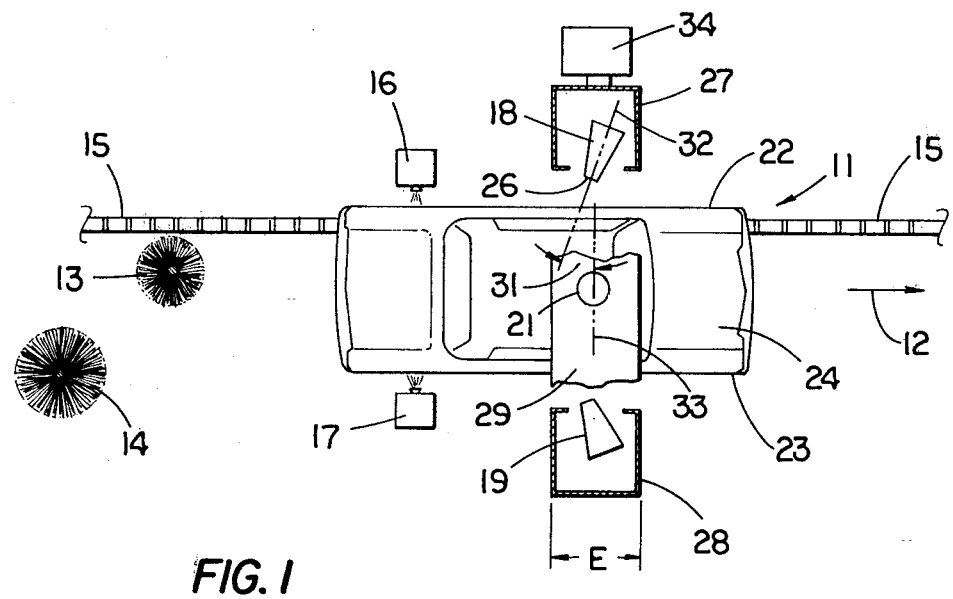
FIG. 1 is a schematic top plan view of vehicle drying apparatus according to one embodiment of the present invention.

Referring now to FIG. 1, there is shown an automobile 11 moving in the direction of arrow 12 from a set of scrubbing brushes 13 and 14 and moved by conveyor 15 through a rinse arch 16 which is spraying rinse water on the car.

According to a typical embodiment of the present invention, three or more nozzles 18, 19 and 21 are mounted in an arch to discharge air on the left side 22, right side 23, and top 24 of the car. Each of the nozzles is of a horn shape, i.e. it has a generally rounded cross section from a large inlet to a much smaller throat and, in longitudinal section, a generally smooth curved wall converging from the large inlet to the throat. This may be as assembly of a series of frusto-conical rings approximating (in assembly) a horn shape, with the small end (such as end 26 for nozzle 18) being nearer the surface of the car, than is the larger end. The larger end is in the arch which in addition to serving as a mount for the nozzles, is actually an inverted U-shaped plenum having two upright columns or legs 27 and 28, and a crossmember 29, all of which are tubular and capable of containing air under pressure. Accordingly, the nozzles receive air from the plenum through their larger ends for discharge from their smaller ends along the axis of the nozzle (the discharge axis in this case) onto the surface of the car.

As indicated in FIG. 1, each of the nozzles is oriented to discharge air in a direction approximately 10 degrees rearwardly from an imaginary plane 33 perpendicular to the path of the car. For example as shown by angle 31 between the axis 32 of nozzle 18 and the transverse plane 33, the nozzle 18 is directed 10 degrees to the rear. The same is true of nozzle 21 and nozzle 19.

Air is supplied to the plenum by a blower 34 located adjacent the bottom of column 27 and discharging directly into the column. This is a blower having a pressure which is high and volume which is low by comparison with blowers typically used at the present time in dryers at car wash establishments. An example is a blower manufactured by the Buffalo Forge Company, their Buffalo Model Seven E blower, arrangement 4 directly connected to a 40 horsepower 3,600 RPM electric motor. It is intended to develop a pressure in the plenum of 1½ lbs. per square inch (p.s.i.; 32–35 inches water gauge). The objective is to have a discharge velocity onto the car of 150–250 mph from each of the three nozzles.

Figure 2:
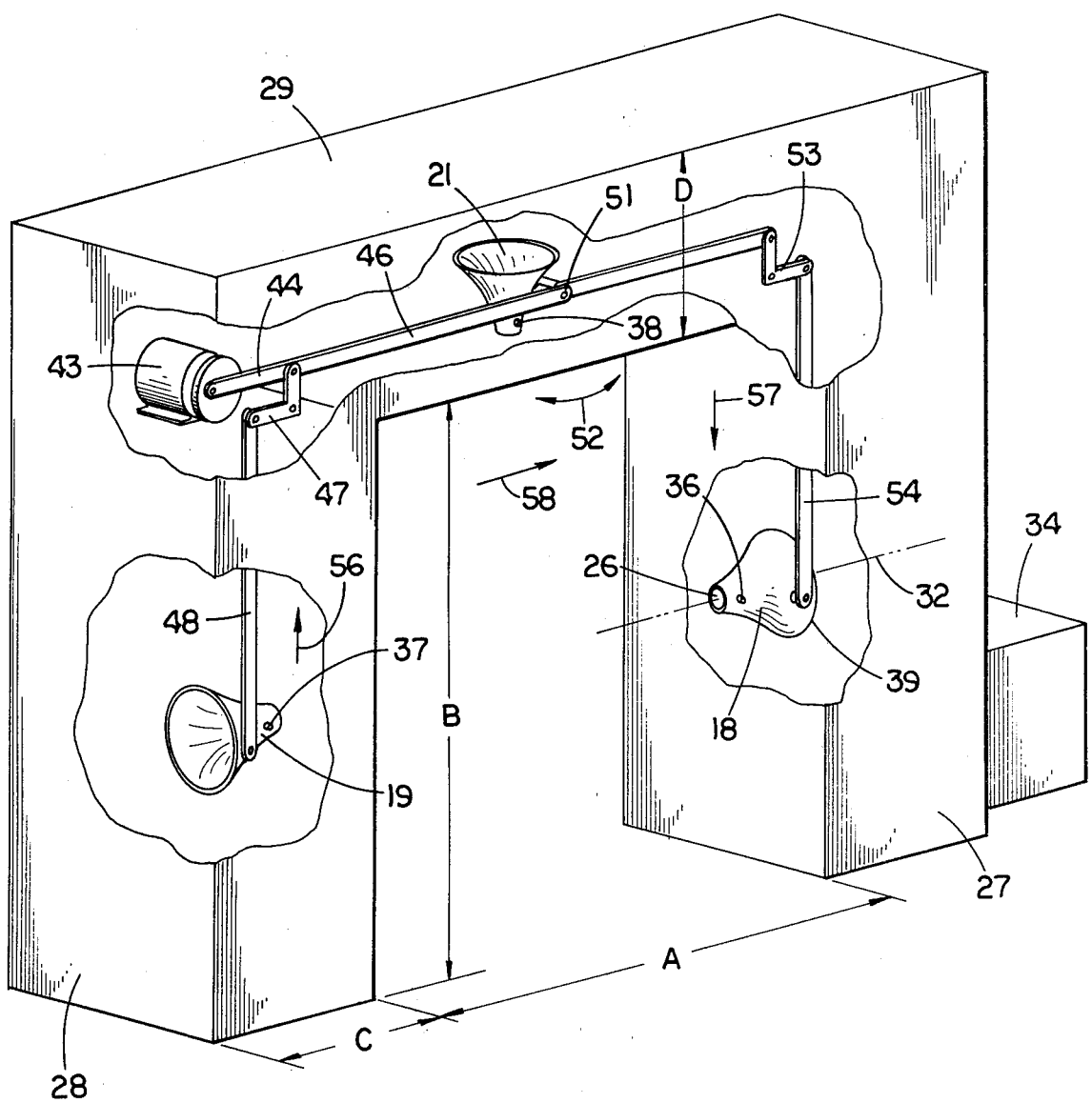
FIG. 2 is a schematic perspective view thereof.

Referring now to FIG. 2, the dryer arch is shown in schematic perspective, and some interior details are illustrated. Nozzles 18, 19 and 21 are shown pivoting on axes 36, 37 and 38, respectively. These may be simply be pivot pins or pillow blocks suitably mounted in the arch. The small end of each nozzle is exposed in the space within the arch, such as small end 26 of nozzle 18. The large end is exposed in the plenum as is the large end 39 of nozzle 18 opening into the plenum column 26. A flexible seal such as rubber, leather, or other material as noted at 41 in FIG. 7, seals the exterior of the nozzle to an opening 42 in the vehicle pathway facing the surface 27A of the arch leg 27, so that the only passageway for discharge of air from the plenum to the pathway is through the small end of the nozzle. The same type of arrangement is used at each of the two other nozzles.

As was indicated in the above-mentioned Solomon patent, (col. 2, line 31) heretofore it was believed that a single vent from a leg of a dryer arch was not adapted to accomodate the wide variety of side contours that exist between various makes and models of automobiles. According to the present invention, it is preferred that each of the nozzles be pivoted as previously mentioned. To implement the pivoting action as the vehicle moves through the array of nozzles, a nozzle oscillator motor 43 is mounted in the arch. It has a crank 44 thereon to which is connected a link 46. The link 46 operates bell crank 47 connected through link 48 pinned to nozzle 19 to oscillate it up and down about the pivot 37. Link 46 is also pinned to nozzle 21 at 51 to oscillate it back and forth in the direction of arrows 52. The link 46 is also connected to bell crank 53 coupled through link 54 to nozzle 18 to oscillate it up and down. The linkage and the cranks are arranged so that when the discharge end of nozzle 19 is moving up in the direction of arrow 56, the discharge end of nozzle 18 is moving down in the direction of arrow 57, and the discharge end of nozzle 21 is moving toward the left-hand side of the car in the direction of arrow 58. This arrangement of the nozzles minimizes interference of the blast of one nozzle with the blast of another nozzle and is thereby intended to enhance the drying operation.

In the embodiment of FIG. 2, the intent is to locate horizontal pivot axes of the side nozzles 18 and 19 at a level of about 36 inches above the floor. The swing of the nozzles would be approximately 30° up from horizontal and 30° down from horizontal. The diameter of the discharge outlet at 26 would be 3 inches. The reciprocating frequency would range between 30 cycles a minute and 120 cycles per minute, depending upon the rate at which cars were being moved through the car wash. More rapid frequency of oscillation would be expected to dry the car more quickly than a slow rate of oscillation.

An example of plenum dimensions, with reference to FIGS. 1 and 2 is as follows:
A. 100 inches.
B. 84 inches.
C. 18 inches.
D. 24 inches.
E. (FIG. 1) 16 inches.

Figure 3A:
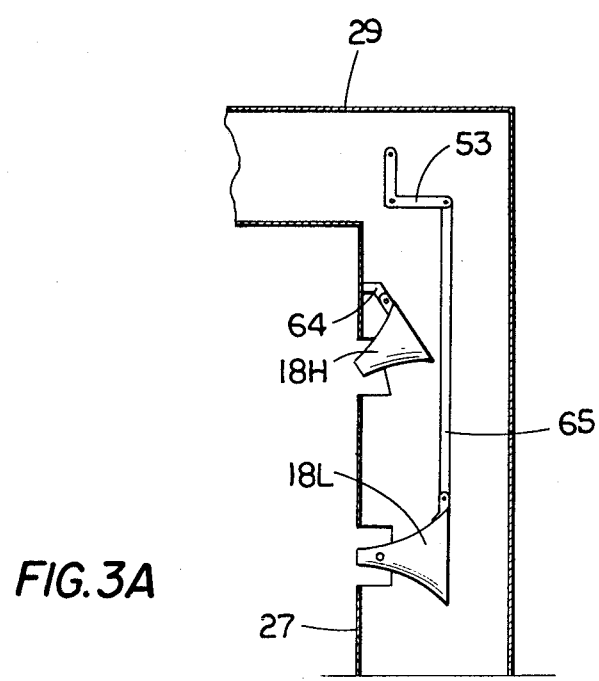
FIG. 3A is a fragmentary schematic of an alternative to the embodiment of FIG. 3.
Figure 3:
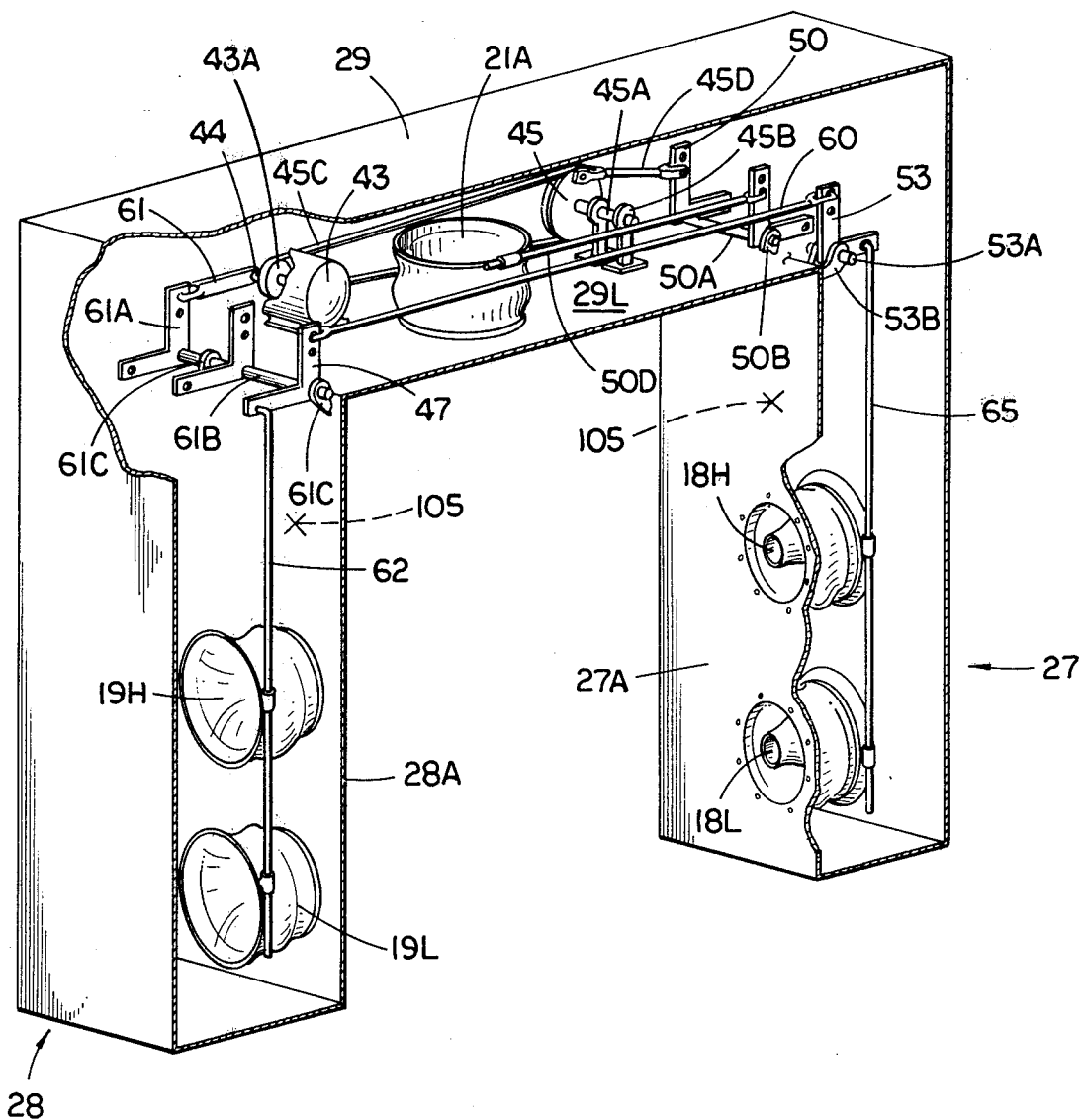
FIG. 3 is a schematic perspective view of a second and preferred embodiment thereof.

FIG. 3 shows an embodiment alternate to FIG. 2 and wherein two nozzles are employed at each side, and a larger nozzle at the top. In FIG. 3 where we are looking at the exit side of the arch, motor 43 is mounted atop the bottom wall 29L of arch crossmember 29. It has a pulley 43 secured to its output shaft, and crank 44 may be secured to the pulley. Link 61 is pinned to this pulley and to crank arm 61A connected to rocker shaft 61B mounted in pillow blocks 61C fixed to the wall 28A of arch leg 28. Bell crank 47 is connected to this shaft 61B. Vertical link 62 is pinned to the horizontal arm of bell crank 47 and to upper and lower side nozzles 19H and 19L, respectively. Horizontal link 60 is pinned to the vertical arm of bell crank 47 and to the vertical arm of bell crank 53 which is connected to shaft 53A mounted in pillow blocks 53B secured to the wall 27A of arch leg 27. Vertical link 65 is pinned to the horizontal arm of bell crank 53 and to upper and lower side nozzles 18H and 18L, respectively.

It has been found desirable to oscillate the top nozzle at a lower frequency than the side nozzles. For example, while it is desirable to oscillate the side nozzles at a frequency of from 60 to 90 complete oscillations or cycles per minute, it is desirable to oscillate the top nozzle at a rate of from 20 to 60 cycles per minute. For this purpose, and further referring to FIG. 3, pulley 45 is mounted to shaft 45A supported by pillow blocks 45B mounted to the bottom wall 29L of arch crossmember 29. Belt 45C from pulley 43A to pulley 45 drives the latter. If pulley diameters of 45 and 43A are in a ratio of 2 to 1, pulley 45 is driven at half the speed of pulley 43A. Link 45D is pinned to pulley 45 and to bell crank 50. Rocker shaft 50A attached to bell crank 50 is mounted in pillow blocks 50B secured to inner wall 27A of arch leg 27. While it is aligned with shaft 53A, it is separate and oscillates at a lower frequency determined by the relative sizes of the two pulleys (half the frequency in this example). It has bell crank 50C connected to it and rocked by it as motor 43 operates. Link 50D connected to crank 50C and to top nozzle 21A oscillates it at half the rate of oscillation of the side nozzles.

In the example, of FIG. 3 the lower nozzles such as 18L would be below the 36 inch level and the upper nozzle 18H would be above the 36 inch elevation. The linkage would drive the side nozzles in the same relative relationships as described above for FIG. 2. With the nozzles at elevations above and below 36 inches, they would be respectively above and below the "belt line" of the largest current production U.S. passenger cars. The oscillations should be through an angle of about 100 degrees for the side nozzles, and about 30 degrees for the top nozzle.

A further alternative to the five oscillating nozzles, would be three oscillating and two stationary. This can be accomplished in the embodiment of FIG. 3 by disconnecting part of the oscillator linkage. For example, to make nozzle 18H a stationary nozzle, link 65 can be disconnected from nozzle 18H. In that event, the point on nozzle 18H which was previously connected to a link, can be secured to the arch leg 27.

An example of this arrangement is shown fragmentarily in FIG. 3A, where link 65 is connected from the bell crank 53 to the lower nozzle 18L only. Upper nozzle 18H is pinned by link 64 to the arch.

In the embodiment of FIG. 3, although the nozzles are round as in FIGS. 1 and 2, the throat diameter of the side nozzles is less, and the throat diameter of the top nozzle is greater. For the side nozzles it is 2.25 inches, and for the top nozzle it is 4.75 inches. Therefore the total throat area for the five nozzles is larger than for three of the three inch nozzles, being about 33.6 square inches compared to about 21 square inches. This will enable a discharge velocity of 300 mph from each of the nozzle outlets when using a blower having a capacity of 4,500 cubic feet per minute (c.f.m.).

The nozzle arrangement and sizes described for FIG. 3 serve well for drying most passenger cars. For such purposes, the vertical clearance between the ground and the bottom wall 29L of arch crossmember 29 is 84 inches.

Figure 4:
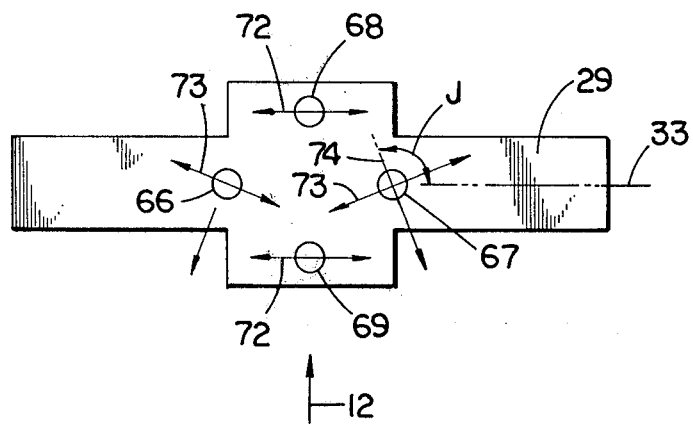
FIG. 4 is a schematic top plan view of a third embodiment thereof.

Referring now to FIG. 4, there is shown schematically a top plan view of an arch 29 which, itself, is similar to that of FIGS. 1-3. Direction of movement of a car through the arch is shown by the arrow 12. Top nozzle location is the point of interest in this figure. Four top nozzles are shown at locations 66, 67, 68, and 69. While the nozzles 66 and 67 are oriented to discharge at an angle of about 10 degrees to the rear of plane 33, and thus obliquely to said plane, as was true for the top nozzle 21 in FIGS. 1-3, they are also mounted on pivot axes which are not perpendicular to plane 33 but are at an angle of between 3 degrees and 5 degrees from perpendicular. This is indicated for example with the pivot axis 74 at an angle J of 93° from plane 33. Accordingly, the direction of discharge along the nozzle discharge axis is not only 10° to the rear from vertical, but also 3° toward the outside of the path of the vehicle. The same is true of nozzle 66.

Nozzles 68 and 69 are located respectively at the exit and entrance faces of the arch, directed downwardly, and can be oscillated to the left and right as indicated by the arrows 72, by mechanisms similar to that employed in FIGS. 2 and 3. Similarly, the arrows 73 represent the side to side oscillation of the nozzles 66 and 67, respectively, about pivot axes such as axis 74 for nozzle 67 and disposed at an angle of between 93° and 95° from the plane 33 transverse to the vehicle path. Where only one top nozzle is used, it is preferred that it be the leading nozzle, i.e. ahead of the side nozzles as shown emphatically by location of nozzle 69 in FIG. 4. This is in order that the blast from the top nozzle be encountered by the vehicle before the blasts from the side nozzles. And so that the drying progresses from the top down from front to rear of the vehicle.

The majority of vehicles washed in the average car wash establishment have a hood over the engine and which is considerably lower than the top of the car over the passenger compartment. Therefore, although the cone shaped nozzles employed according to the present invention do provide a concentrated blast of air, with considerable holding power in terms of the diameter of the high velocity stream of air discharging from the nozzle, some performance improvement may be obtainable on certain vehicles by having the top nozzle closer to the car than it would be if it were intended to dry only the top of the car, and not the hood or a rear deck as in the notch-back type of car. This is of considerable importance where the dryer will be used to dry van-type passenger vehicles, which have become increasingly popular in recent years. Where the car wash is expected to serve a large percentage of such vehicles, especially with a bubble-type of top hatch, the arch crossmember will be higher so the lower wall 29L thereof will be 90 inches above the floor. For better top drying performance on non-van vehicles, where the arch crossmember is so high, the embodiments of FIGS. 5 and 6 for the top nozzle mounting and extension have been devised.

Figure 5:
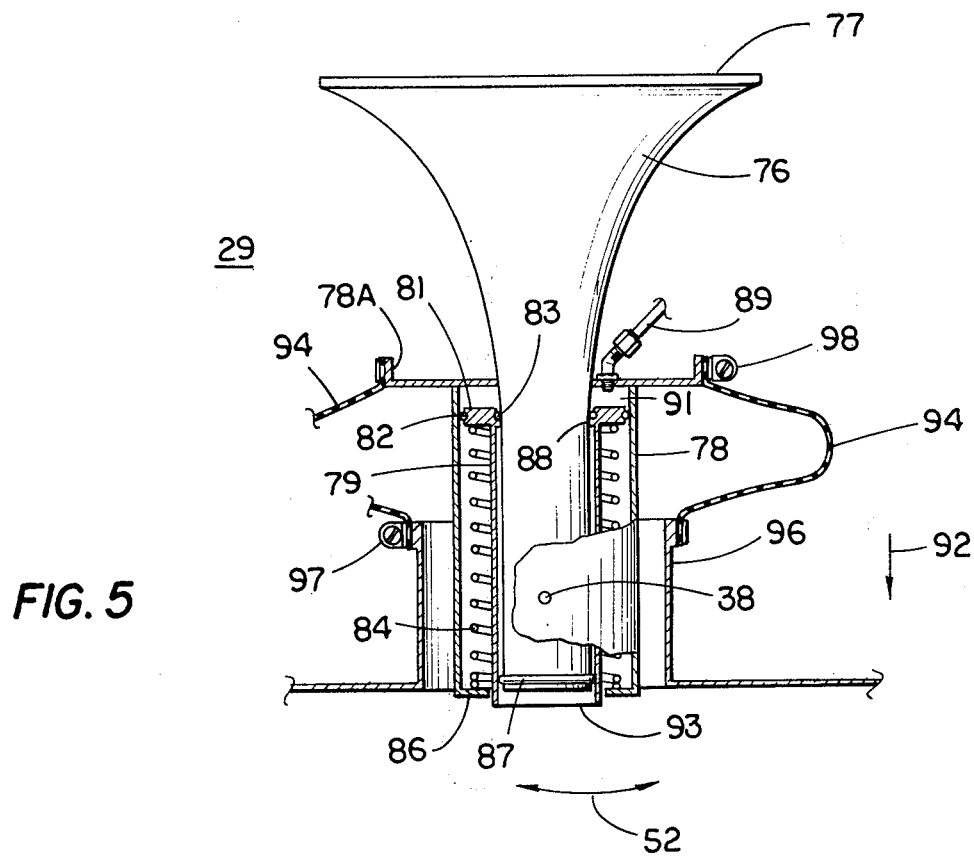
FIG. 5 is an elevational view, partly in section, of an extendable top nozzle assembly according to one embodiment of the invention.
Figure 6:
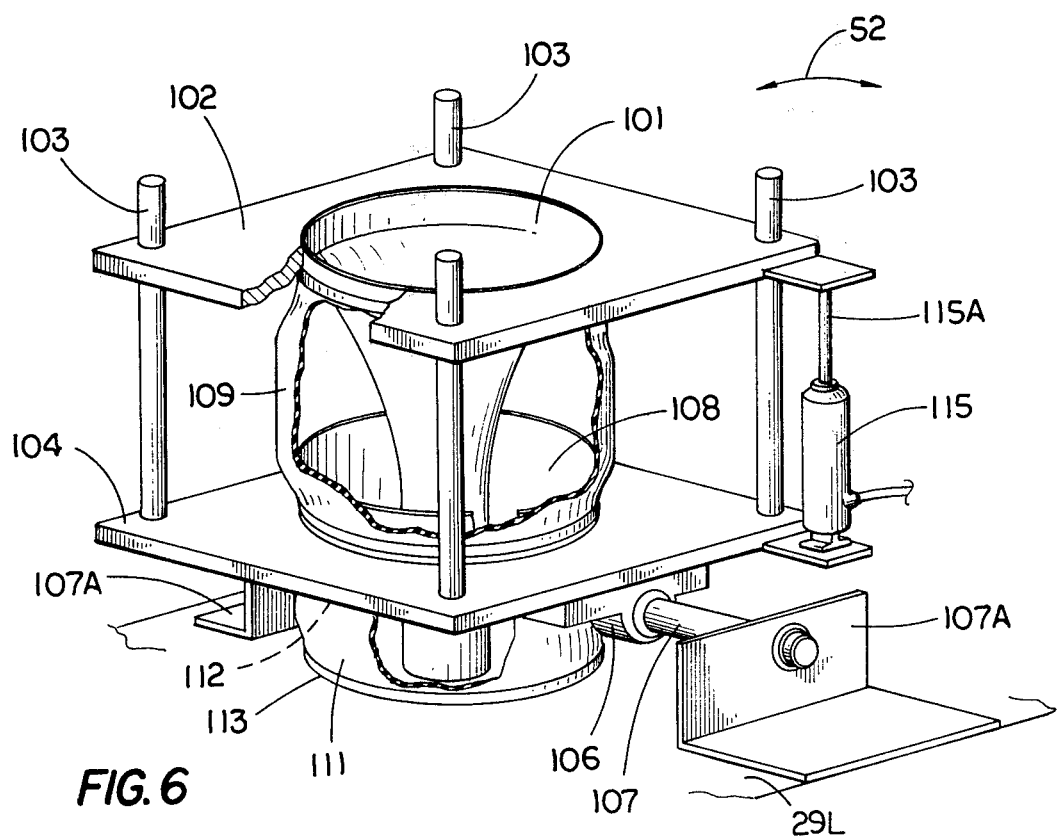
FIG. 6 is a perspective view showing an extendable top nozzle according to a second embodiment of the invention.

Referring specifically to FIG. 5, the top nozzle has a primary portion 76 with the large entrance end 77 and a mounting to the dryer arch cross member 29 by means of the pivot to the shaft or boss 38. An extension housing cylinder 78 is affixed to the nozzle 76 and oscillates back and forth with it in the direction of the arrows 52 by oscillating means such as shown in FIGS. 2 and 3, for example. The extension housing 78 contains a nozzle extension 79 which is a tube positioned coaxial with the nozzle and extendable coaxial with the nozzle. Flange 81 is provided at the upper end of the nozzle extension tube 79. The flange is sealed by a circumferential seal 82 on the inside wall of extension cylinder 78. It is sealed to the nozzle itself by a circumferential seal 83 secured to the inside wall of the extension tube 79 at the flange 81. An extension tube return spring 84 is provided in the space between the extension tube 79 and extension housing 78. This may be a single coil spring coaxial with the tubes, or can be a plurality of circularly spaced coil springs, for example. The lower ends of the springs are seated on the inturned flange 86 at the lower end of the housing 78. Stop means in the form of a ring 87 or some other configuration, may be affixed to the lower end of the nozzle tube itself, for engagement with a stop ring 88 at the upper end of the extension tube and which is aligned with flange 81 and serves as an additional support for the upper seal 83.

An air supply line 89 is connected to a chamber 91 in the housing 78 immediately above the flange 81. In this way, the application of air under pressure providing a force on flange 81 greater than the return force exerted by return spring 84, will extend the extension tube downward toward the car hood and top in the direction of arrow 92. A wand or other means can be used with an air supply valve from a compressed air source to apply air to this extension tube expansion piston combination to move the lower end 93 of the extension tube into close proximity with the hood of the car. As the car windshield approaches the nozzle, a wand or other means can be provided to release the pressure sufficiently to permit the return spring 84 to raise the nozzle extension tube in a direction opposite arrow 92 until it is fully retracted by the time the top of the vehicle is under the lower end 93 of the extension tube. In this embodiment, the upper end of the housing 78 can be sealed to the plenum portion 29 by means of a flexible seal member 94 secured to housing flange 78A by hose clamp or strap 98, and secured to an upturned cylindrical flange 96 on the bottom 29L of the plenum crossmember by means of a strap 97 or other means. It thus seals the opening in the plenum in which the nozzle oscillates in the direction of arrow 52, to provide the coverage desired with the nozzle blasting power of the nozzle according to the present invention.

Figure 7:
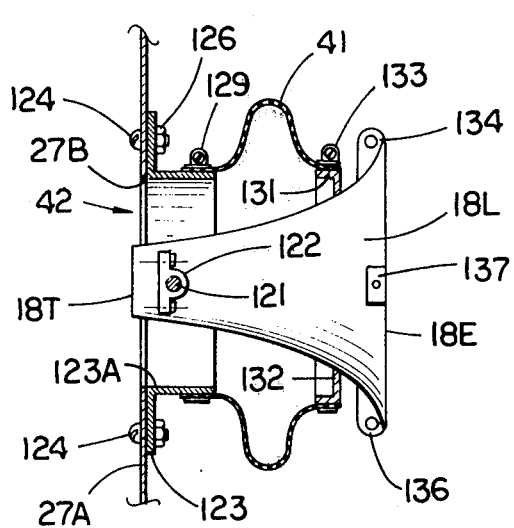
FIG. 7 is an elevational view, partly in section, showing details of a side nozzle installation according to this invention.

Referring now to FIG. 7, another embodiment of a downwardly extendable and upwardly retractable top nozzle is shown. In this embodiment, the nozzle 101 has its upper end affixed to a sliding plate 102 slidable vertically on four posts 103 affixed to a pivot plate 104 pivotally mounted through a pair of pillow blocks 106 to a pivot shaft 107 on each side of the plate and which shafts, in turn, are affixed by brackets 107A to the bottom 29L of the plenum cross member 29. Accordingly, the whole assembly, including lower plate 104, posts 103, upper plate 102, and nozzle 101 can rock back and forth in the direction of arrows 52. The lower plate has a circumferential hole 108 in the bottom thereof, through which the nozzle 101 can be extended downward while the exterior of the nozzle remains circularly sealed to the bottom plate by a flexible cylindrical boot 109. The pivot plate may likewise be sealed to the bottom of the plenum by a flexible cylindrical boot 111 affixed to the bottom of the plate at 112 and to the bottom of the plenum at 113. The extension and retraction of the nozzle 101 can be accomplished by an air cylinder 115 secured to plate 104 and having a piston rod connected to plate 102.

Where there is expected to be a large percentage of van-type vehicles dried, it may be desirable to add two more side nozzles in the arch at the locations 105 in FIG. 3. These can be driven by the same linkage as nozzles 18 and 18H and 19L and 19H. However the side nozzle sizes would be smaller, with throat diameters of 1.75 inches. This would provide a total outlet area of 14.4 square inches for the six side nozzles and the same 17.7 for the top nozzle, or a combined total of 32.1 square inches. Therefore the above-mentioned velocity of 300 mph with a 4,500 cfm blower will be achieved with this seven nozzles version as well as with the five nozzle version of FIG. 3.

Referring to FIG. 7, which shows typical side and top nozzle shape and installation details according to this invention, the nozzle 18L has a pair of shafts, one such shaft 121 affixed to each side of the nozzle immediately upstream of the nozzle throat. Each shaft is pivotally received in a bearing assembly 122 affixed to mounting plate 123, secured to the arch leg inner wall 27A by bolts or screws 124, for example. Plate 123 can have threaded holes in it to receive the screws; or nuts 126 can be pre-welded or staked to plate 123 to receive the screws for convenience of mounting of the nozzle assembly to the arch. A gasket can be used to seal the plate to the wall around the respective openings 123A and 27B therein, if desired, but usually is not needed if the screws are sufficient in number, and the plate and wall faces are sufficiently flat.

Plate 123 has a cylindrical flange 127 extending axially into the interior of arch leg 27. A flexible sealing boot 41 of leather, rubber or other suitable material is affixed around the inner end portion 129 by a worm-screw type of hose clamp 129. Another cylindrical flange 131 is part of a ring 132 affixed and perimetrically sealed to the nozzle near its entrance end 18E. The other end of the boot is secured to flange 131 by worm-type hose clamp 133. In this way, the only passageway for air from the plenum is from the nozzle entrance 18E, through the nozzle to its exit 18T.

For convenient attachment of oscillating cords or rods to the nozzle, apertured connectors may be provided at top and bottom as shown at 134 and 136 adjacent the entrance 18E, and on the front and rear adjacent entrance 18E as at 137. Since this basic nozzle assembly can be used also for a top nozzle as at 21A in FIG. 3, for example, or for side and top nozzles in FIGS. 1, 2 and 4, the choice of connector bracket will be made to best meet the needs of convenience in driving them. The preferred shape of the nozzle is as shown in FIG. 7.

Figure 8A:
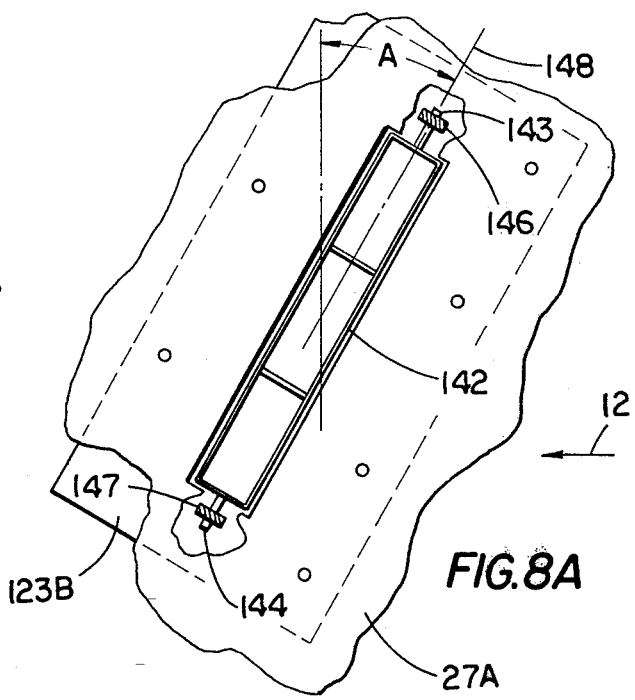
FIG. 8A is a schematic view showing orientation of the nozzle of FIG. 8.
Figure 8:
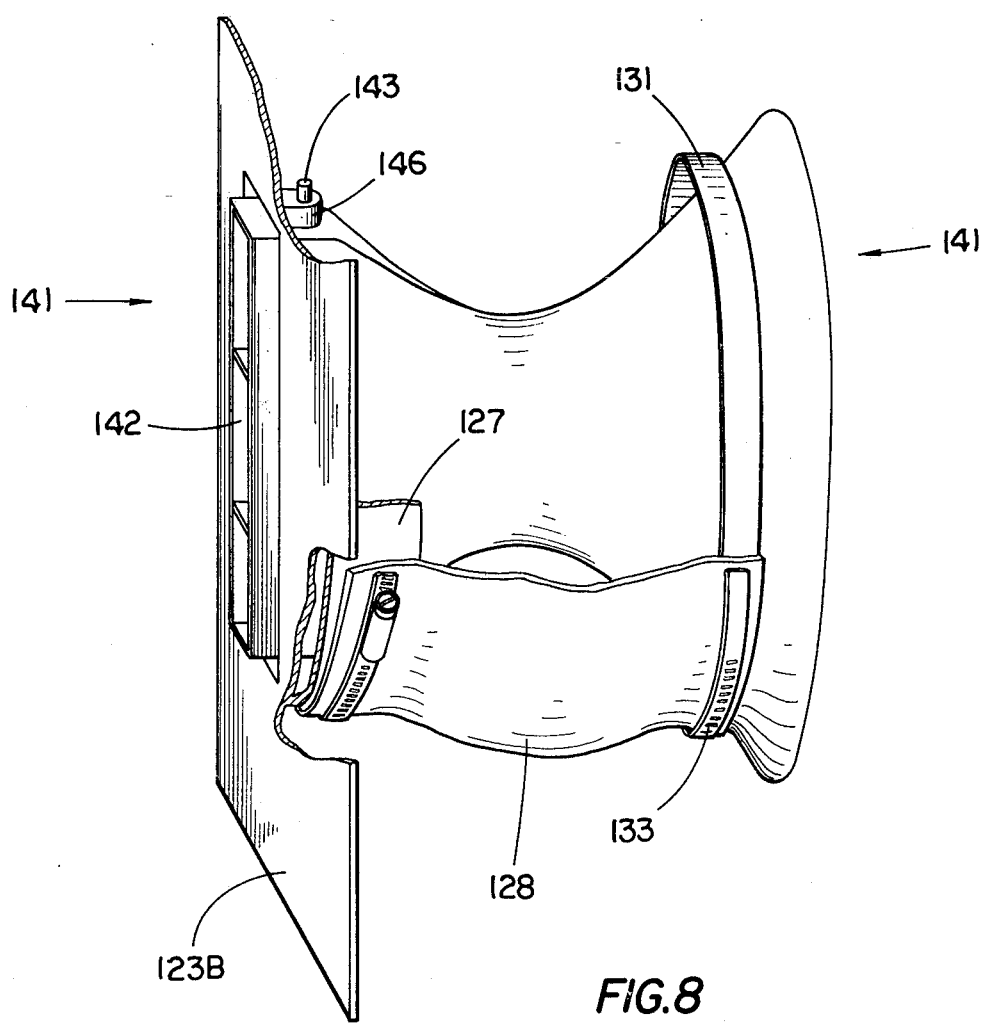
FIG. 8 is a perspective view of a slotted pivoting side nozzle.

Referring now to FIG. 8, there is shown a slotted pivoting nozzle 141. The entrance end, mounting plate and sealing boot, are essentially the same as in FIG. 7, so description of those details need not be repeated here. Apparent differences include the rectangular, much elongated slot shape of the nozzle exit end 142, the different location of the pivot axis, and the slot orientation (best shown in FIG. 8A). The slot dimensions selected will depend on the typical size and number of vehicles to be dried per hour, the total available power, the choice and location of nozzles, all within the above described framework of low volume, high velocity, and low power requirements.

Where the slotted nozzles are to be used at the side of the vehicle, the mounting shafts 143 and 144 will be fixed to the top and bottom of the nozzle as in FIG. 8. These will be pivotally received in bearing assemblies 146 secured to mounting plate 123B. Plate 123B in FIG. 8 may be larger than that in FIG. 7 for a slot nozzle of the same discharge area as round nozzle in FIG. 7, simply due to the greater vertical dimension of the slot. Boot 128 is also larger than boot 41, for the same reason. The orientation of the resulting pivot axis 148 is about 15 degrees from vertical as best shown at angle "A" in the schematic of FIG. 8A where we are looking directly into the nozzle. The nozzle is to be connected to linkage suitable for oscillating it through an arc of 60° behind a plane containing the pivot axis and transverse to the path of the vehicle. The upper end of the nozzle is nearer the entrance side of the arch, so that the air discharged is discharged slightly downward and more toward the rear of the vehicle during most of the oscillation cycle. The nature of discharge is a high velocity (150 mph or more) sheet of air.

Although specific flow rates and dimensions have been mentioned above, as examples for the various embodiments, it is believed that two nozzles at each side and one larger nozzle at the top are preferable. The velocity of air from each nozzle should be between 150 and 350 mph. The plenum static pressure should range from 18 to 49 inches of water and this should be obtainable with the horsepower rating at from 20 to 60 horsepower and with a volume of from 2,500 to 8,500 cfm. This range of capabilities should be effective to handle a variety of car wash requirements from the slowest and least car volume, to the largest and highest volume of cars per hour. The optimum would appear to be a volume of 4,500 cu. ft. per minute and discharge velocity of 220 to 350 mph using a motor of approximately 30 to 40 horsepower. This is said to be optimum considering not only performance, but also economics and energy saving considerations.

Generally, vehicles traveling through a car wash in a guide rail maintain a fixed distance relationship to the left or driver side of the cleaning and drying equipment. Therefore, since all vehicles will be the same distance from the left or driver side, their right or passenger side will vary its distance from the cleaning and drying equipment. This design permits having smaller outlet diameter cone nozzles on the fixed driver or left side, and larger diameter cone nozzles on the right or passenger side allowing a stronger air blast on the different smaller width vehicles.

The invention claimed is:
1. In a vehicle drying apparatus having air discharge means and a vehicle pathside mount for same, the improvement comprising:
    at least one nozzle having a discharge axis directed generally horizontally toward the path of the vehicle, said nozzle having a pivot axis for pivoting to tilt said discharge axis and blast air against the side of a vehicle above and below a given point;
    an inverted U-shaped plenum serving as said mount, said plenum having horizontally spaced legs and an upper crossmember spanning the space between said legs, and being large enough for a vehicle to pass between said legs and under said crossmember, said one nozzle being in one leg of said plenum;
    another nozzle substantially like said one nozzle and located in the other leg of said plenum, the discharge axes of said nozzles being directed generally toward an imaginary plane which is equidistant from said legs and perpendicular to an imaginary plane containing said legs;

a third nozzle substantially like said one nozzle and mounted on said crossmember and having a discharge axis directed downward;

air being supplied under pressure to all of said nozzles from said plenum;

said third nozzle being extendable downwardly, having a mount accommodating such vertical extension, the mount comprising:

(a) a base member pivotally mounted to said crossmember and having a nozzle passage opening therein;

(b) guidepost means projecting upward from said base member;

(c) a nozzle support affixed to said nozzle and guidingly received on said guidepost means and slidable vertically thereon; and (d) said third nozzle being fixed to said nozzle support and projectable downward through said nozzle passage opening when said support is slided downward on said guidepost means.

2. The improvement of claim 1 wherein:

said crossmember has a nozzle passage opening in it; and said base member is disposed at said nozzle passage opening in the crossmember, said improvement further comprising:

first flexible seal means secured to said base member and to said crossmember around the respective openings in them to accommodate pivoting of the base member on the crossmember, while preventing leakage of air from said plenum around the outside of said base member and through said nozzle passage opening in the crossmember.

3. The improvement of claim 2 wherein:

said base member is spaced above and covers a portion of the bottom of said crossmember at said nozzle passage opening in the crossmember; and said seal means is generally in the form of a tube providing a first flexible passageway, with said third nozzle extending therethrough.

4. The improvement of claim 2, said mount further comprising:

second flexible seal means secured to said base member around said nozzle passage opening in it and secured to the exterior of said third nozzle and providing a seal tube surrounding a portion of said third nozzle and accommodating extension and retraction of said third nozzle without leakage of air from said plenum around the exterior of said third nozzle.

* * * * *